Figure 1:
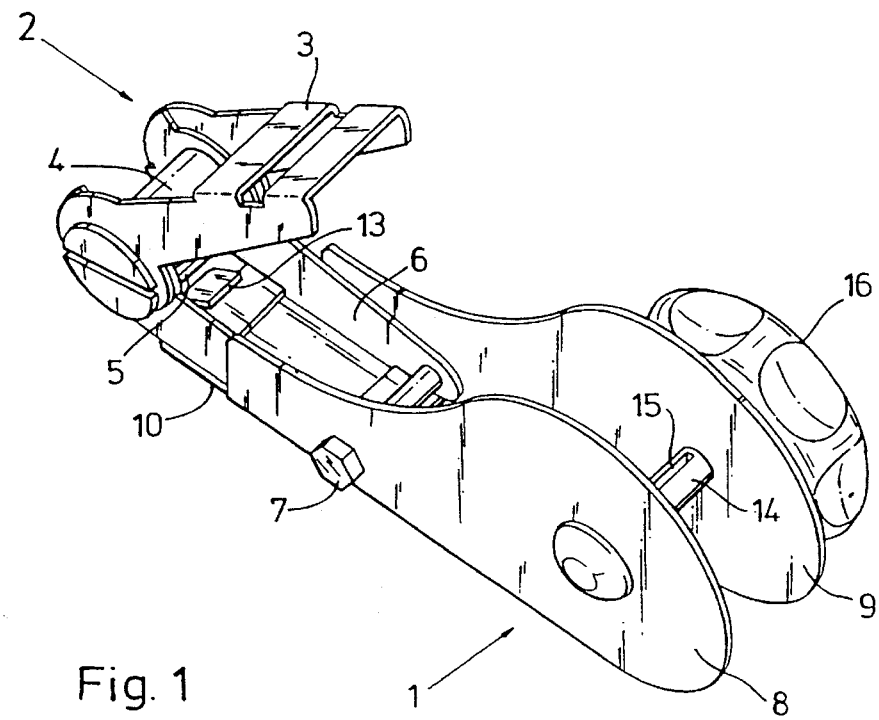

United States Patent [19]

Söderström

[11] Patent Number: 5,611,520
[45] Date of Patent: Mar. 18, 1997

[54] STRAP COLLECTOR

[75] Inventor: Sven-Erik Söderström, Enköping, Sweden

[73] Assignee: Alvin C. Collins, Colorado Springs, Colo.

[21] Appl. No.: 302,817

[22] PCT Filed: Mar. 15, 1993

[86] PCT No.: PCT/SE93/00222

§ 371 Date: Sep. 12, 1994

§ 102(e) Date: Sep. 12, 1994

[87] PCT Pub. No.: WO93/18937

PCT Pub. Date: Sep. 30, 1993

[30] Foreign Application Priority Data

Mar. 16, 1992 [SE] Sweden .................................. 9200801

[51] Int. Cl.⁶ ............................ B25B 25/00; B65H 75/28; B65H 18/10; B61D 45/00
[52] U.S. Cl. .................. 254/218; 24/68 CD; 242/388.4; 242/388.7; 242/532.6; 242/546.1; 254/369; 410/103
[58] Field of Search ....................... 254/217, 218, 254/223, 369, 376, 214, 382; 242/388.1, 388.2, 388.3, 388.4, 388.5, 388.6, 388.7, 532.6, 546.1; 410/100, 103; 24/68 CD, 68 BT, 191

[56] References Cited

U.S. PATENT DOCUMENTS

| 4,584,742 | 4/1986 | Speich .................................. 24/68 CD |
| 4,622,721 | 11/1986 | Smetz et al. ......................... 254/218 X |
| 5,316,266 | 5/1994 | Chou .................................... 254/369 X |

FOREIGN PATENT DOCUMENTS

| 3639712 | 6/1988 | Germany ............................ 24/68 CD |
| D911126 | 2/1992 | Sweden . |
| 93/18937 | 9/1993 | WIPO ..................................... 410/100 |

Primary Examiner—Michael Mansen
Attorney, Agent, or Firm—Young & Thompson

[57] ABSTRACT

A strap collector (1) is provided which is designed to be attached to the connecting arm (6) of a cargo tightener (2). The strap collector includes a magazine (8, 9) for the protection and storage of the long tensioning strap of the cargo tightener when wound to the shaft (14) of the strap collector. In this manner the strap will be stored, without affecting or impeding the active parts of the strap tightener and without having the tensile force, applied by the cargo tightener upon lashing the cargo down, loading the strap collector or the end of the strap wound thereto.

6 Claims, 3 Drawing Sheets

STRAP COLLECTOR

The present invention relates to a device for collection and storage of the free, non-active portion of a strap of a manually operated cargo tightener, which is used to secure cargo to be transported. More precisely, the invention relates to a strap collector for use in combination with such a cargo tightener.

Cargo tighteners of the type that is here referred to comprises hook-equipped straps of various widths and lengths, and shows various designs to meet the requirements from both "hobbyists" and from the professional haulage contractor. The invention is not concerned with the type of cargo tighteners which can be found, permanently mounted on a transportation vehicle and comprising a strap tightening drum or roller, actuated by a spring means or a drive means, onto which the strap is wound both for securing the cargo and for storing of the strap when not in operation.

The typical tightener to be used in combination with the strap collector of the invention, includes a shaft, rotatably attached in one end of a lever. The shaft is journalled in one end of a connecting arm, thus providing a rotatable attachment of the lever to the connecting arm. A first strap is firmly secured to a bolt in the connecting arm and in its free end including a hook for attachment to the transportation vehicle, and a second strap, likewise including a hook in one of its ends, is inserted through a slit in the rotatable shaft upon lashing down cargo. Toothed discs or ratchet wheels are secured to the shaft and engaging spring actuated detent pawls, respectively supported in the connecting arm and in the lever.

Upon securing the cargo to the transportation vehicle, the first strap is attached to a hook or a loop on the vehicle, and the second strap is inserted with its free end in the slit in the tightener shaft, around which the strap is wound in order to tighten the straps. Once the second strap has been secured to a corresponding hook or loop on the vehicle, the straps are thus tightened by forcing the shaft with its slit to rotate by means of the lever, the second strap becoming wound to the shaft a number of turns. The shaft is prevented from rotating in the opposite direction by the ratchet wheels engaging the spring actuated detent pawl of the connecting arm, which, upon untightening of the straps, is moved in a direction opposite the spring force to release the ratchet wheels, permitting the shaft to rotate and thus loosen the straps.

A common problem when using the abovementioned cargo tightener with tensioning straps with hook(s) concerns the handling of the free end of the strap not used when securing the cargo. This strap portion has to be thoroughly secured to the cargo in order not to flutter in the encountering wind or to trail on the ground, both cases leading to a hasty soiling and wearing down of the strap. Further, a freely fluttering strap is a danger to traffic, particularly in connection with the wider, 8–10 meter long straps used professionally by haulage contractors. Also, the collection of the strap for its storage or keeping after its use is considered by the professional as a time-wasting and irritating procedure. Today, the straps are manually formed to a roll, but, in practice, no aid has proved to be suitable for keeping the strap in this position, and the straps often get all tangled up, a nuisance whenever the strap is to be used next.

A known device for managing these problems, see swedish design application no. 91-1126, discloses a winding device, which, after a modification of the lever of the cargo tightener, is attached to the outer end thereof. A drawback with such a structure is that the wound portion of the strap has an interfering effect on the tightening of the strap, in part since the strap roll limits the clearance of the lever reciprocating movement, in part since it will be difficult to grasp the lever. Another drawback is that the strap roll is not prevented from tilting over, i.e. one or more turns are released and form a tangle at the side of the roll. Further, the strap extension along the lever interferes with the operation of the disengagement device.

The aim of the present invention is to provide a device for the collection and storage of the free end of the strap when securing cargo as well as for the storage and protection of the loose strap in its entirety when the cargo tightener is not in use, which does not present the drawbacks associated with the known device.

This aim is achieved by a device of the invention, the characteristics of which are stated in the set of claims.

Briefly, the invention provides a strap magazine designed to be attached to the connecting arm of a cargo tightener of the type stated above, if appropriate without a modification thereof, the magazine comprising two opposite side walls with an interconnecting bottom portion and a shaft, which is provided with a through slit, the shaft being journalled in the side walls and pivotable by means of a knob or a crank attached to one end of the shaft. This structure provides a strap, which, wound up, is well prevented from tilting over by the covering side walls, at the same time as the lever of the cargo tightener is free to unlimited operation. In operation, the strap collector/magazine will store and protect the non-active portion of the strap, which portion is stored unaffected by the tensile force of the cargo tightener straps.

Figure 4:
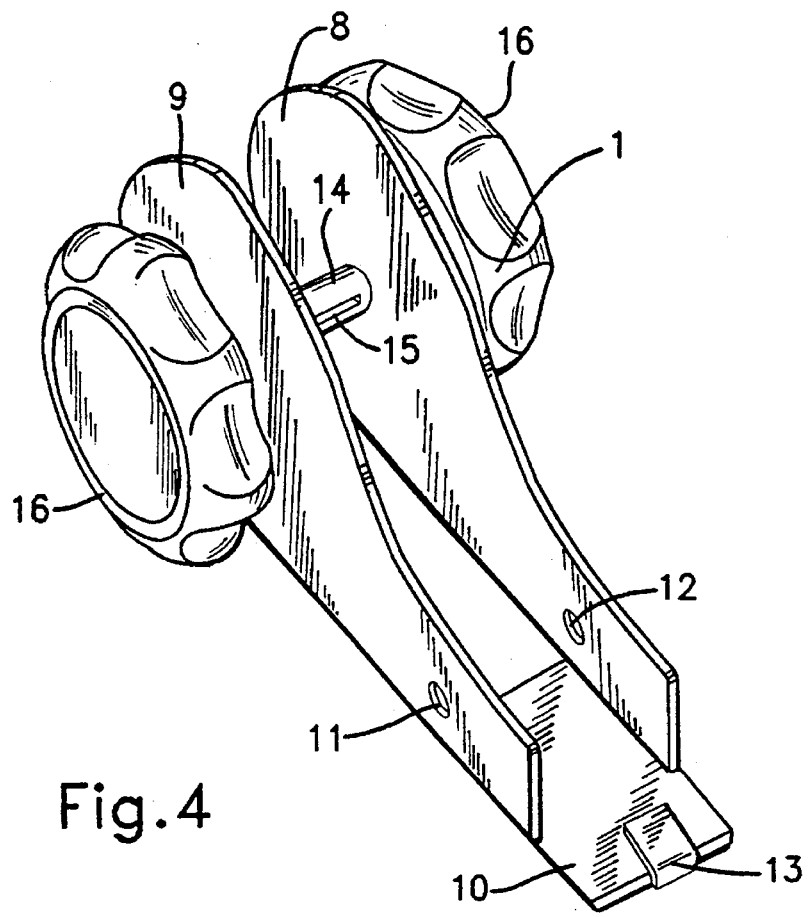
Figure 5:
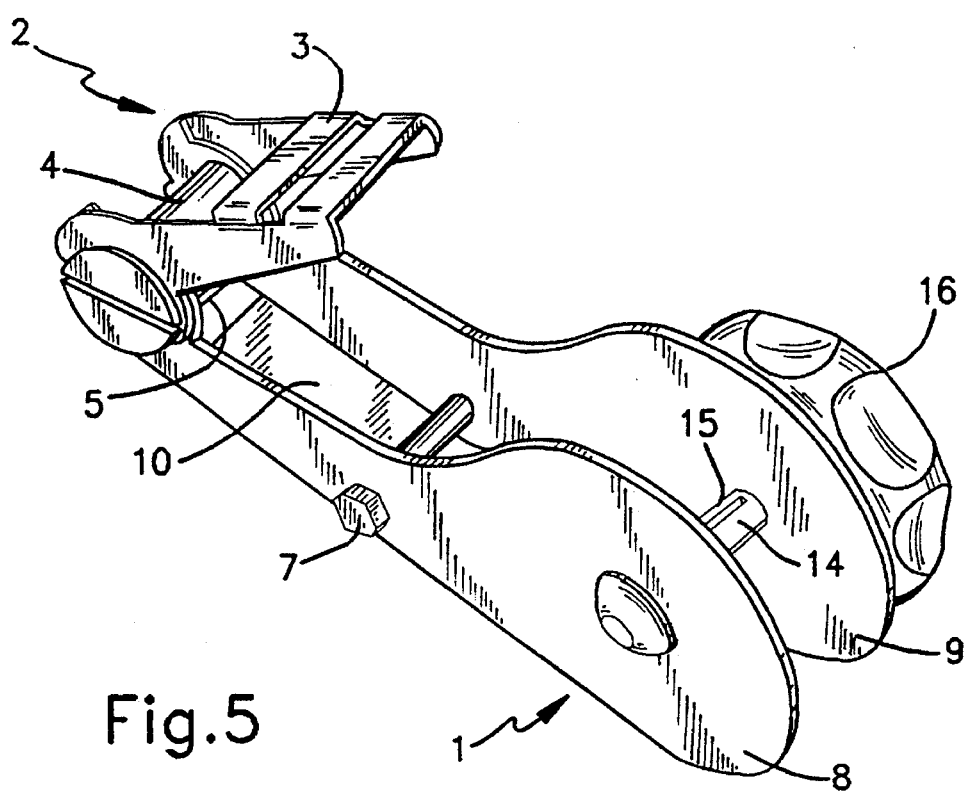

The invention will now be described in closer detail with reference made to the appended drawings, which illustrate exemplifying embodiments of the device. The drawings show in FIG. 1 a perspective view of a strap collector according to the invention, connected to a cargo tightener, FIG. 2 a perspective view of the strap collector of FIG. 1 seen from another angle of view, FIG. 3 a schematic view of the path of the strap through the cargo tightener and the strap collector, FIG. 4 is a perspective view depicting an alternative embodiment of the present invention, and FIG. 5 is a perspective view depicting yet another alternative embodiment of the present invention.

In FIG. 1, a strap collector, generally referred to by the reference number 1, is connected to a schematically illustrated cargo tightener 2 of the type commonly used to secure smaller amounts of goods to be transported. The cargo tightener 2 provides a lever 3 for rotation of the shaft 4, to which a strap 21 (see FIG. 3) with a hook is wound when lashing down the cargo. The shaft 4 has a through slit 5, through which the free end of the strap is inserted, and is journalled in a connecting arm 6, in the outer end of which a shorter strap 20 (see FIG. 3), which also is provided with a hook, is attached by means of a bolt 7. The connecting arm 6 is stationary in the sense that is does not take part in a reciprocating motion when the straps 20, 21 are tightened. The cargo tightener and its function are not parts 0f the invention, thus its construction will not be explained in detail.

Figure 2:
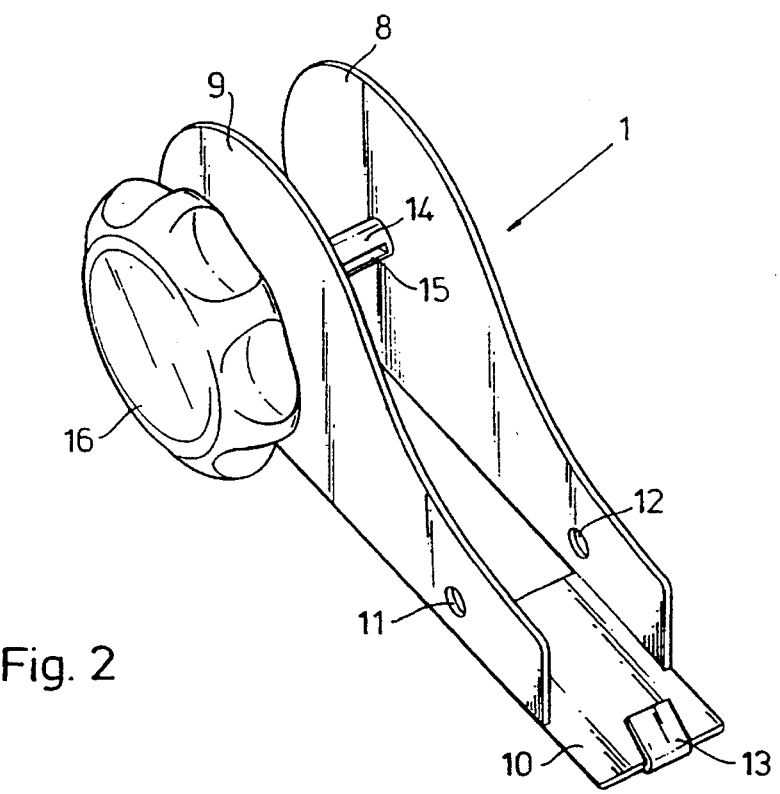

FIG. 2 shows a detached strap collector 1 of the invention, the two opposite side walls 8 and 9 of which are connected perpendicularly to a common bottom portion 10 to form a magazine for the wound strap. The respective side wall 8 and 9 comprises an opposing, aligned borehole 11,12, disposed exactly in front of or closely adjacent to the back edge of the bottom portion 10. In the front edge of the bottom portion 10 facing the cargo tightener 2, the bottom portion 10 includes a folded back flap 13. A shaft 14, which is provided with a through slit 15, is centrally located as well as journalled in the widest portion of the side walls 8 and 9. The shaft 14 protrudes through side wall 9 in order to permit a twist grip such as a crank or a knob 16 to be attached thereto, but it is, of course, possible to design the strap collector 1 with, for instance, one knob 16 at each side in order to make it adapted to both right- and left-handed users. For example, FIG. 4 depicts an embodiment identical to the embodiment of FIG. 2 with the exception that shaft 14 protrudes through both side walls 8 and 9, a knob 16 being attached to the shaft at each side.

Figure 3:
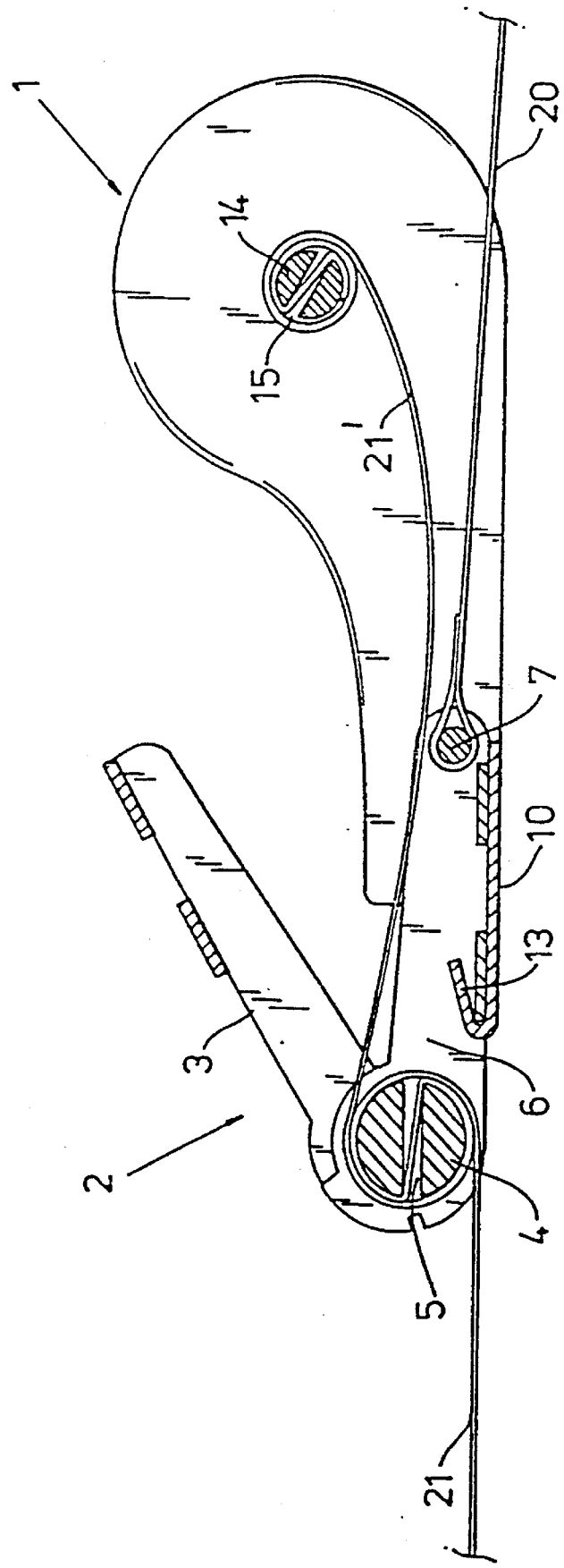

FIG. 3 shows the way a strap collector 1 is connected to a cargo tightener 2 by loosening the bolt 7 provided to attach the shorter strap 20 and by removing the strap. A cross bar on the connecting arm 6 of the cargo tightener is then inserted under the bottom portion flap 13, and the bore holes 11 and 12 of the side walls 8 and 9 respectively are brought to alignment with the through slot of the bolt 7 in the arm 6. The bolt 7 is then reinserted along with the strap 20, which in this situation will hang loosely under the strap collector without loading any part thereof when securing cargo. By accurately dimensioning the bottom portion 10 of the strap collector as well as the distance between the flap 13 and the bore holes 11 and 12, the strap collector will thus be firmly connected to the cargo tightener.

Since the strap collector 1 of the embodiment described hereabove is detached from the cargo tightener lever 3, the lever is readily operable to tighten the strap 21 or to assume a position, in which the strap may easily be pulled off the strap collector. The inner end of the strap roll is loosely tucked into the slit 15 on the strap collector shaft 14, in order to avoid the hazard of a locked situation occurring when the strap in its entirety is used to lash down the cargo.

The strap collector of the embodiment described above can advantageously be dimensioned to hold the wider and longer straps that are used professionally by haulage contractors.

In the embodiment depicted in FIG. 1, the strap collector is connected to the stationary, connecting arm of an existing cargo tightener. It will however be appreciated that the strap collector and the arm may be integrally designed, the advantages associated with the invention being preserved. For example, FIG. 5 an embodiment identical to the embodiment of FIG. 1 with the exception that rather than attaching the strap collector 1 to the cargo tightener 2 using the connecting arm 6, in the embodiment depicted in FIG. 6 the arm 6 is intergral with respective side walls 8 and 9.

In a modified embodiment of the strap collector 1, a spring drive means is provided to wind the strap to the shaft 14. In that case, the spring drive is suitably combined with a manual pivoting element and a manual brake and/or a centrifugal brake. It will also be readily appreciated, that a locking or a retaining means can be installed in the strap collector to prevent undesired rotation of the shaft 14.

With a strap collector of the invention a protective storage of the long tensioning strap of the cargo tightener is achieved and an easily operable aid for the handling of the non-active portion 21, of the strap when securing cargo is provided while keeping the function and the operation of the cargo tightener completely unaffected. The strap collector and the wound portion of the strap therein is completely detached from the tensile force, which is applied by the cargo tightener, yet it is well anchored because of the particular attachment to the connecting arm of the cargo tightener. The structure means a substantial improvement as far as traffic safety and ergonomics are concerned, particularly in the professional environment.

I claim:

1. A strap collector (1) attached to a cargo tightener (2) having an arm (6) extending in a longitudinal direction and having a transversely positioned crossbar, and a lever (3) which is pivotally journalled in said arm (6) by a shaft (4), said shaft having a slit (5) for introducing one end of a first strap (21), the shaft being operable for co-rotational movement with the lever upon tightening said first strap, the arm (6) having a free end which includes a first aperture and a second aperture extending through said arm (6), said first aperture being aligned with said second aperture for receipt of a bolt (7) for attachment of a second strap (20) of fixed length, said strap collector (1) comprising:

a magazine comprising a first side wall (8) and a second opposing side wall (9) connected together by a bottom portion (10), said bottom portion having a folded flap (13) extending therefrom, a first hole extending through said first side wall and a second hole extending through said second opposing side wall, said first hole being aligned with said second hole for receipt of said bolt (7) for securing said strap collector to said cargo tightener, and a pivoting element (14, 16) attached to said magazine and rotatable for winding and storage of a non-active portion (21') of said first strap (21) when said strap collector is in use, whereby when said strap collector is attached to said cargo tightener said folded flap (13) will be in engagement with the transversely positioned crossbar of said arm (6) and said bolt (7) will extend through said first hole and said second hole for attaching said strap collector to said cargo tightener such that the bottom portion (10) will extend adjacent to and in the longitudinal direction of the arm (6) to permit said second strap (20) to operate independently of the strap collector and to permit the non-active portion (21') of the first strap (21) to be stored in the magazine without being affected by any load applied by the cargo tightener upon securing cargo.

2. A strap collector (1) according to claim 1 wherein said pivoting element comprises a shaft (14) journalled in the first side wall (8) and second opposing side wall (9), said shaft comprising a slit (15) through which a free end of said first strap (21) is removably insertable to be wound around the shaft (14), said shaft having a projecting portion which projects relative to at least one side wall of said magazine, and a manually operable grip (16) attached to said projecting portion.

3. A strap collector (1) according to claim 1, wherein said pivoting element comprises a shaft (14) journalled in the first side wall (8) and second opposing side wall (9), said shaft comprising a slit (15) through which a free end of said first strap (21) is removably insertable to be wound around the shaft (14), said shaft having a first portion at one shaft end which projects relative to said first side wall and a second portion at an opposite shaft end which projects relative to said second opposing side wall, a first manually operable grip attached to said first projecting portion and a second manually operable grip attached to said second projecting portion.

4. Apparatus for tightening and collecting a strap, comprising:

a cargo tightener portion (2) having an arm segment (6) extending in a longitudinal direction, and a lever (3) which is pivotally journalled in said arm segment (6) by a shaft (4), said shaft having a slit (5) for introducing one end of a first strap (21), the shaft being operable for co-rotational movement with the lever for tightening said first strap, and a strap collector portion comprising a magazine formed by a first side wall (8) and a second opposing side wall (9) connected together by a bottom segment (10), said bottom segment extending in the longitudinal direction of the arm (6), a first hole extending through said first side wall and a second hole extending through said second opposing side wall, said first hole being aligned with said second hole, a bolt (7) extending into said first hole and said second hole and being adapted for attachment to a second strap (20) during use, and a pivoting element (14, 16) attached to said magazine and adapted for winding and storage of a non-active portion (21') of said first strap (21) when said strap collector is in use.

5. Apparatus according to claim 4 wherein said pivoting element comprises a shaft (14) journalled in the first side wall (8) and second opposing side wall (9), said shaft comprising a slit (15) through which a free end of said first strap (21) is removably insertable to be wound around the shaft (14), said shaft having a portion which projects relative to at least one side wall of said magazine, and a manually operable grip (16) attached to said portion.

6. Apparatus according to claim 4, wherein said pivoting element comprises a shaft (14) journalled in the first side wall (8) and second opposing side wall (9), said shaft comprising a slit (15) through which a free end of said first strap (21) is removably insertable to be wound around the shaft (14), said shaft having a first portion at one shaft end which projects relative to said first side wall and a second portion at an opposite shaft end which projects relative to said second opposing side wall, a first manually operable grip attached to said first portion and a second manually operable grip attached to said second portion.

* * * * *